(12) United States Patent
Yamakawa et al.

(10) Patent No.: US 11,398,790 B2
(45) Date of Patent: Jul. 26, 2022

(54) AIR CONDITIONER (71) Applicant: Mitsubishi Electric Corporation, Tokyo (JP)

(72) Inventors: Takashi Yamakawa, Tokyo (JP); Koichi Arisawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 375 days.

(21) Appl. No.: 16/621,113

(22) PCT Filed: Jul. 28, 2017

(86) PCT No.: PCT/JP2017/027357
§ 371 (c)(1),
(2) Date: Dec. 10, 2019

(87) PCT Pub. No.: WO2019/021448
PCT Pub. Date: Jan. 31, 2019

(65) Prior Publication Data
US 2020/0212833 A1 Jul. 2, 2020

(51) Int. Cl.
*H02P 25/18* (2006.01)
*H02P 27/06* (2006.01)
*F25B 1/00* (2006.01)
*H02M 7/5387* (2007.01)

(52) U.S. Cl.
CPC ........ *H02P 25/18* (2013.01); *H02M 7/53871* (2013.01); *H02P 27/06* (2013.01)

(58) Field of Classification Search
CPC ........ H02P 25/18; H02P 25/184; H02P 27/06; H02M 7/53871; F25B 1/00
See application file for complete search history.

(56) References Cited

U.S. PATENT DOCUMENTS

| | | | |
|---|---|---|---|
| 5,675,238 A | 10/1997 | Asano | |
| 11,005,410 B2 * | 5/2021 | Iwazaki | ................ H02P 29/027 |
| 11,101,763 B2 * | 8/2021 | Nigo | ....................... H02P 25/18 |
| 2010/0237815 A1 | 9/2010 | Higashikawa et al. | |
| 2015/0168033 A1 * | 6/2015 | Yamakawa | ........... F25B 49/025 |
| | | | 62/324.6 |
| 2020/0021231 A1 * | 1/2020 | Yamakawa | ............. H02P 25/18 |

FOREIGN PATENT DOCUMENTS

| | | |
|---|---|---|
| JP | H4-355697 A | 12/1992 |
| JP | H08-163899 A | 6/1996 |
| JP | 2008-228513 A | 9/2008 |
| WO | 2009/084354 A1 | 7/2009 |

* cited by examiner

*Primary Examiner* — Thai T Dinh
(74) *Attorney, Agent, or Firm* — Posz Law Group, PLC (57) ABSTRACT

An air conditioner includes a compressor to compress a refrigerant used in a refrigeration cycle, a converter to generate DC voltage, an inverter to generate three-phase AC voltage from the DC voltage, a motor to generate driving force to drive the compressor by using a plurality of coils to which the three-phase AC voltage is applied, a connection switching unit to switch connection states of the plurality of coils, and an outdoor control device to control the connection switching unit. The outdoor control device restricts the switching of the connection states when a switching count of the connection states exceeds a count threshold value.

10 Claims, 9 Drawing Sheets

AIR CONDITIONER

CROSS REFERENCE TO RELATED APPLICATION

This application is a U.S. national stage application of International Patent Application No. PCT/JP2017/027357 filed on Jul. 28, 2017, the disclosure of which is incorporated herein by reference.

TECHNICAL FIELD

The present invention relates to an air conditioner, and in particular, to an air conditioner capable of switching connection states of a plurality of coils used for generating driving force for driving a compressor.

BACKGROUND

There has been proposed a method for efficiently driving a motor by switching the connection state such as a Y connection state and a Δ connection state according to the revolution speed of the motor (the load on the motor). With regard to the air conditioning load, for example, by driving the motor in the Y connection state in an intermediate condition having a high degree of contribution to annual electric energy consumption and driving the motor in the Δ connection state in a rated condition, it is possible to increase the efficiency in the intermediate condition in which the load is low and increase the output power in the rated condition in which high air conditioning capacity is necessary.

In order to switch the connection states between the Y connection state and the Δ connection state, a connection switching unit formed with mechanical switches (SWs) such as relays and contactors or semiconductor SWs such as bidirectional SWs is used. In this case, the connection states can be switched by controlling the connection switching unit by use of signals from a control unit such as a microcomputer.

Here, in case of failure of the connection switching unit, there happens a connection abnormality state, which may induce expanded damage such as malfunction or secondary failure of the system.

Patent Reference 1 discloses a wiring switching device including a state detector that detects conduction state of each electric power semiconductor switch element constituting a selector switch unit of a wiring switching unit and a comparator that detects abnormality of the wiring switching unit based on the result of the detection by the state detector and a drive signal outputted from a control unit of an inverter.

PATENT REFERENCE

Patent Reference 1: WO 2009/084354

The wiring switching device disclosed in the Patent Reference 1 has a problem in that the occurrence of abnormality of the wiring switching unit cannot be controlled even though miswiring of the wiring switching unit and failure of the selector switch unit can be detected.

SUMMARY

It is therefore an object of the present invention to control the occurrence of failure of the connection switching unit while maintaining the advantages of high efficiency and high output power gained by carrying out the connection switching on an appropriate switching condition.

An air conditioner according to an aspect of the present invention is an air conditioner using a refrigeration cycle, comprising: a compressor to compress a refrigerant used in the refrigeration cycle; a converter to generate direct current voltage; an inverter to generate three-phase alternating current voltage from the direct current voltage; a motor to generate driving force to drive the compressor by using a plurality of coils, the three-phase alternating current voltage is applied to the plurality of coils; a connection switching unit to switch connection states of the plurality of coils; and a connection control unit to control the connection switching unit. The connection control unit restricts the switching of the connection states when a switching count of the connection states exceeds a count threshold value.

According to an aspect of the present invention, the occurrence of failure of the connection switching unit can be controlled while maintaining the advantages of high efficiency and high output power gained by carrying out the connection switching on an appropriate switching condition.

DETAILED DESCRIPTION

Figure 1:
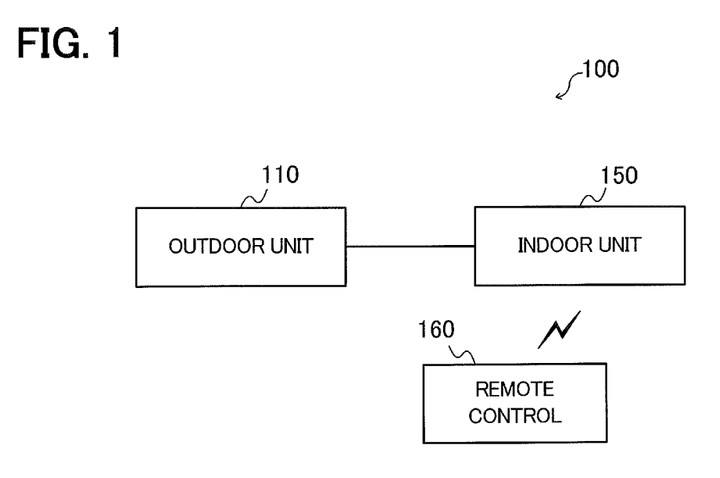
FIG. 1 is a block diagram schematically representing the configuration of an air conditioner according to an embodiment.

FIG. 1 is a block diagram schematically representing the configuration of an air conditioner 100 according to an embodiment employing a refrigeration cycle.

The air conditioner 100 includes an outdoor unit 110 installed outdoors, an indoor unit 150 installed in a room, and a remote control 160.

Figure 2:
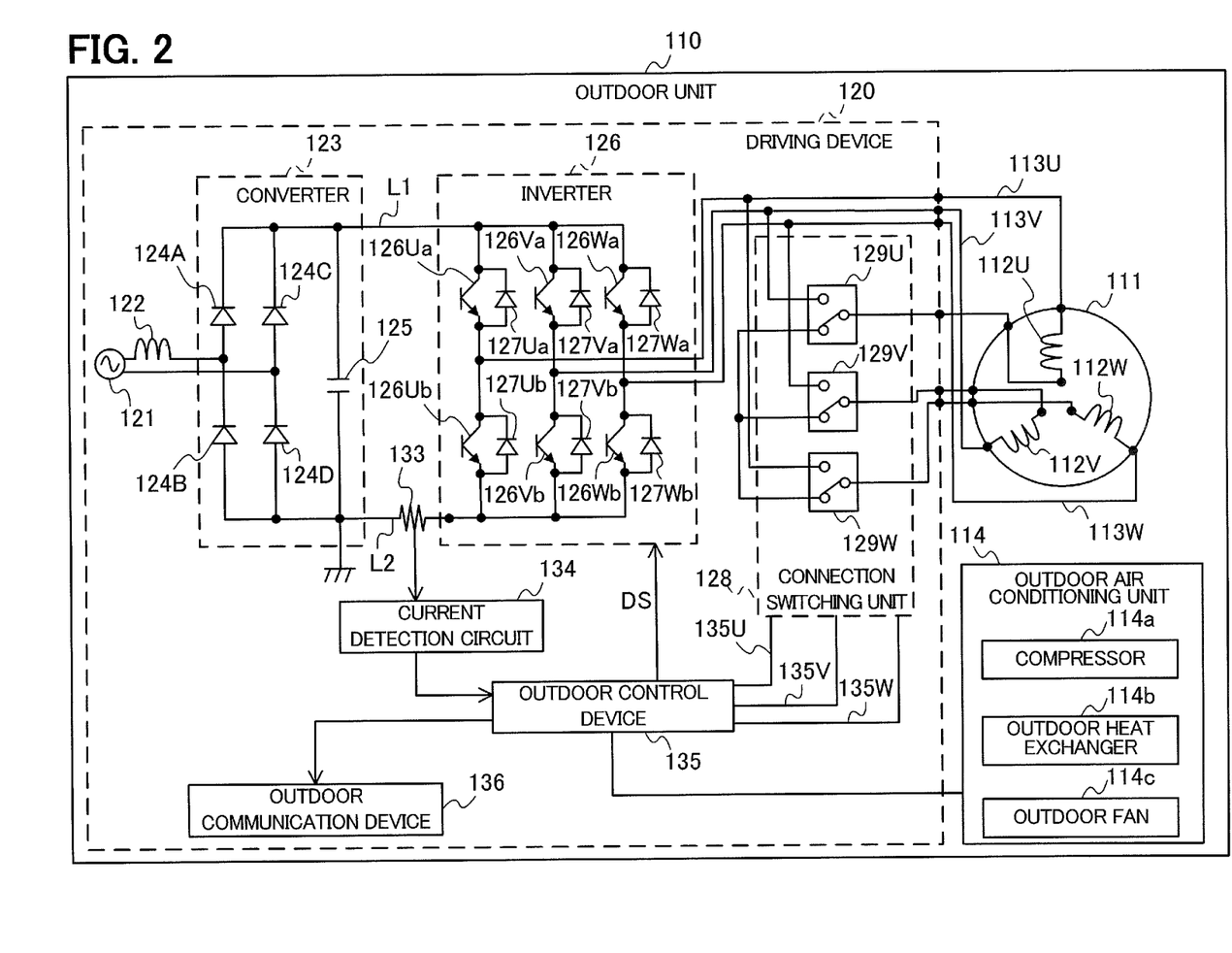
FIG. 2 is a schematic configuration diagram of an outdoor unit according to the embodiment.

FIG. 2 is a schematic configuration diagram of the outdoor unit 110.

The outdoor unit 110 includes a motor 111, an outdoor air conditioning unit 114 and a driving device 120.

The motor 111 generates driving force for driving a particular part included in the outdoor air conditioning unit 114 by using a plurality of coils to which three-phase AC voltage from the driving device 120 is applied. The motor 111 receives the application of the three-phase AC voltage from the driving device 120 via a U-phase power line 113U, a V-phase power line 113V and a W-phase power line 113W. The motor 111 includes a U-phase coil 112U connected to the U-phase power line 113U, a V-phase coil 112V connected to the V-phase power line 113V, and a W-phase coil 112W connected to the W-phase power line 113W.

The outdoor air conditioning unit 114 performs an operation on an outdoor side of a refrigeration cycle. For example, the outdoor air conditioning unit 114 includes devices such as a compressor 114a, an outdoor heat exchanger 114b and an outdoor fan 114c.

The compressor 114a obtains driving force from the motor 111 and thereby performs compression of a refrigerant used in the refrigeration cycle.

The outdoor heat exchanger 114b performs heat exchange of the refrigerant.

The outdoor fan 114c is a fan that sends air to the outdoor heat exchanger 114b in the outdoor unit 110.

The driving device 120 is a device for driving the motor 111 while controlling each part of the outdoor unit 110.

The driving device 120 includes a power supply 121, a reactor 122, a converter 123, an inverter 126, a connection switching unit 128, a current detection circuit 134, an outdoor control device 135 and an outdoor communication device 136.

The power supply 121 is an AC power supply that outputs AC voltage.

The converter 123 receives the AC voltage from the power supply 121 via the reactor 122 and generates DC voltage by performing rectification, smoothing, or the like on the AC voltage.

The converter 123 includes bridge diodes 124A to 124D for rectifying the AC voltage and a smoothing capacitor 125 for smoothing output voltage.

The inverter 126 receives an input of the DC voltage from the converter 123, generates the three-phase AC voltage from the DC voltage, and outputs the generated three-phase AC voltage to the motor 111.

In the inverter 126, a first U-phase switching element 126Ua, a second U-phase switching element 126Ub, a first V-phase switching element 126Va, a second V-phase switching element 126Vb, a first W-phase switching element 126Wa and a second W-phase switching element 126Wb are connected in three-phase bridge connection of the U phase, the V phase and the W phase.

The first U-phase switching element 126Ua corresponds to a U-phase upper arm, while the second U-phase switching element 126Ub corresponds to a U-phase lower arm. The first U-phase switching element 126Ua and the second U-phase switching element 126Ub are connected to the U-phase power line 113U.

Incidentally, a first U-phase diode 127Ua is connected in parallel with the first U-phase switching element 126Ua, and a second U-phase diode 127Ub is connected in parallel with the second U-phase switching element 126Ub.

The first V-phase switching element 126Va corresponds to a V-phase upper arm, while the second V-phase switching element 126Vb corresponds to a V-phase lower arm. The first V-phase switching element 126Va and the second V-phase switching element 126Vb are connected to the V-phase power line 113V.

Incidentally, a first V-phase diode 127Va is connected in parallel with the first V-phase switching element 126Va, and a second V-phase diode 127Vb is connected in parallel with the second V-phase switching element 126Vb.

The first W-phase switching element 126Wa corresponds to a W-phase upper arm, while the second W-phase switching element 126Wb corresponds to a W-phase lower arm. The first W-phase switching element 126Wa and the second W-phase switching element 126Wb are connected to the W-phase power line 113W.

Incidentally, a first W-phase diode 127Wa is connected in parallel with the first W-phase switching element 126Wa, and a second W-phase diode 127Wb is connected in parallel with the second W-phase switching element 126Wb.

Each of the switching elements 126Ua-126Wb can be formed with a transistor such as an IGBT (Insulated Gate Bipolar Transistor), for example.

Setting each of the switching elements 126Ua-126Wb to on or off is controlled by a drive signal DS from the outdoor control device 135.

The connection switching unit 128 switches the connection states of the plurality of coils included in the motor 111 between a first connection state and a second connection state. Here, the second connection state is a state in which line-to-line voltage of the inverter 126 becomes lower than that in the first connection state. For example, the first connection state is a Y connection state and the second connection state is a Δ connection state.

The connection switching unit 128 includes a U-phase switch 129U, a V-phase switch 129V and a W-phase switch 129W.

The U-phase switch 129U is a switching unit for switching the connection targets of the U-phase coil 112U.

The V-phase switch 129V is a switching unit for switching the connection targets of the V-phase coil 112V.

The W-phase switch 129W is a switching unit for switching the connection targets of the W-phase coil 112W.

Figure 3:
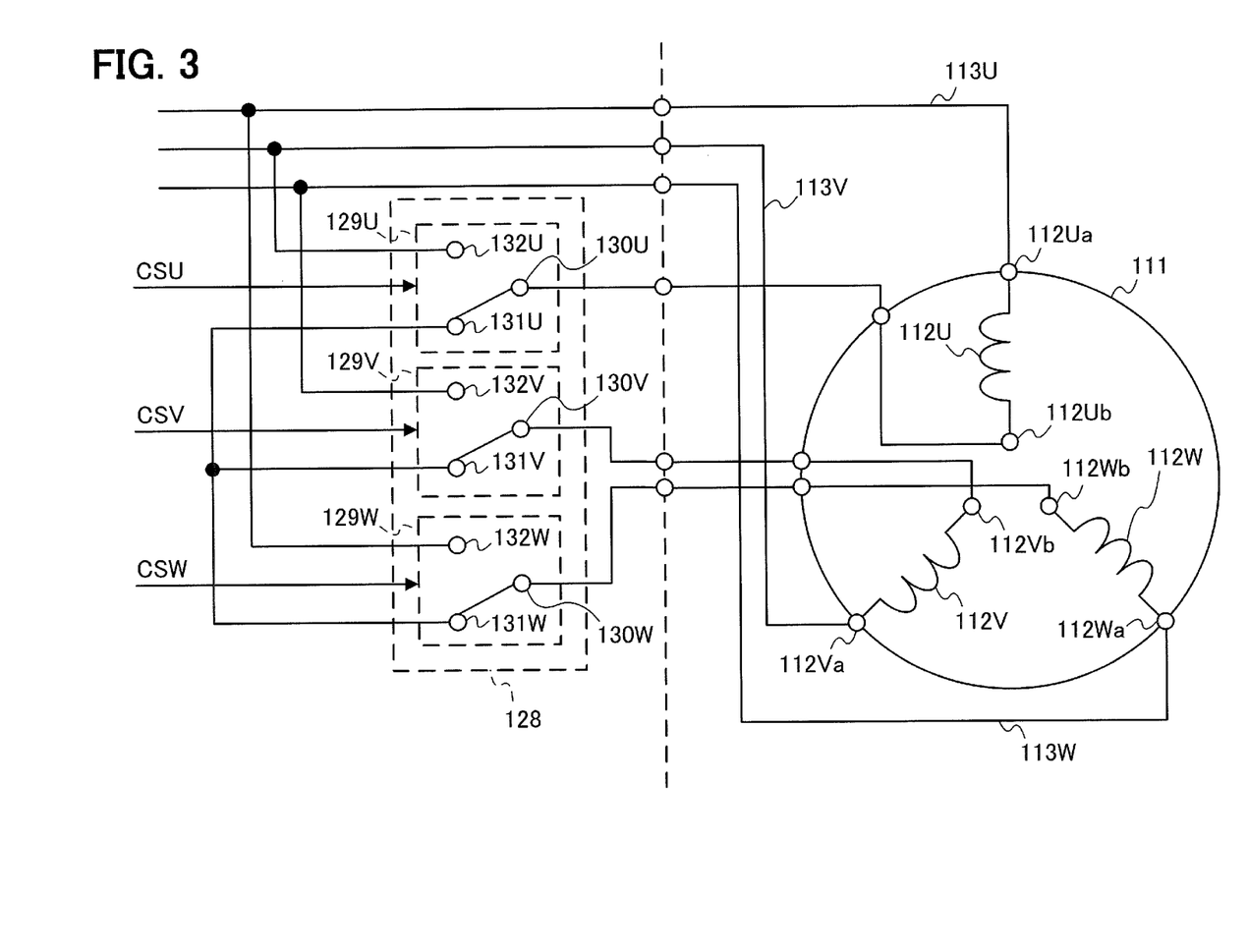
FIG. 3 is a schematic diagram representing a first example of connection states of a motor and a connection switching unit in the embodiment.

FIG. 3 is a schematic diagram representing a connection state of the motor 111 and the connection switching unit 128.

An end 112Ua of the U-phase coil 112U is connected to the U-phase power line 113U, while the other end 112Ub of the U-phase coil 112U is connected to a common contact 130U of the U-phase switch 129U.

A first switch contact 131U of the U-phase switch 129U is connected to a first switch contact 131V of the V-phase switch 129V and a first switch contact 131W of the W-phase switch 129W.

A second switch contact 132U of the U-phase switch 129U is connected to the V-phase power line 113V.

The U-phase switch 129U is capable of switching the connections to the common contact 130U between the first switch contact 131U and the second switch contact 132U.

An end 112Va of the V-phase coil 112V is connected to the V-phase power line 113V, while the other end 112Vb of the V-phase coil 112V is connected to a common contact 130V of the V-phase switch 129V.

The first switch contact 131V of the V-phase switch 129V is connected to the first switch contact 131U of the U-phase switch 129U and the first switch contact 131W of the W-phase switch 129W.

A second switch contact 132V of the V-phase switch 129V is connected to the W-phase power line 113W.

The V-phase switch 129V is capable of switching the connections to the common contact 130V between the first switch contact 131V and the second switch contact 132V.

An end 112Wa of the W-phase coil 112W is connected to the W-phase power line 113W, while the other end 112Wb of the W-phase coil 112W is connected to a common contact 130W of the W-phase switch 129W.

The first switch contact 131W of the W-phase switch 129W is connected to the first switch contact 131U of the U-phase switch 129U and the first switch contact 131V of the V-phase switch 129V.

A second switch contact 132W of the W-phase switch 129W is connected to the U-phase power line 113U.

The W-phase switch 129W is capable of switching the connections to the common contact 130W between the first switch contact 131W and the second switch contact 132W.

Since the connection switching unit 128 is configured as above, the motor 111 can be set to the Y connection state in which the other end 112Ub of the U-phase coil 112U, the other end 112Vb of the V-phase coil 112V, and the other end 112Wb of the W-phase coil 112W are connected together by connecting the common contact 130U with the first switch contact 131U in the U-phase switch 129U, connecting the common contact 130V with the first switch contact 131V in the V-phase switch 129V, and connecting the common contact 130W with the first switch contact 131W in the W-phase switch 129W. In contrast, the motor 111 can be set to the Δ connection state in which the end 112Ua of the U-phase coil 112U and the other end 112Wb of the W-phase coil 112W are connected to the U-phase power line 113U, the end 112Va of the V-phase coil 112V and the other end 112Ub of the U-phase coil 112U are connected to the V-phase power line 113V, and the end 112Wa of the W-phase coil 112W and the other end 112Vb of the V-phase coil 112V are connected to the W-phase power line 113W by connecting the common contact 130U with the second switch contact 132U in the U-phase switch 129U, connecting the common contact 130V with the second switch contact 132V in the V-phase switch 129V, and connecting the common contact 130W with the second switch contact 132W in the W-phase switch 129W.

Here, the U-phase switch 129U, the V-phase switch 129V and the W-phase switch 129W are capable of individually switching the connection targets of the common contacts 130U to 130W between the first switch contacts 131U to 131W and the second switch contacts 132U to 132W according to switching signals CSU, CSV and CSW from the outdoor control device 135.

While each of the U-phase switch 129U, the V-phase switch 129V and the W-phase switch 129W is described as a c-contact switch, these switches are not limited to such an example. It is permissible if each of the U-phase switch 129U, the V-phase switch 129V and the W-phase switch 129W is a switch capable of bidirectionally opening and closing. For example, each of the U-phase switch 129U, the V-phase switch 129V and the W-phase switch 129W may be formed in combination with an a-contact switch or a b-contact switch, or may also be a semiconductor switch.

Incidentally, a switch whose conduction loss at the time of being on is low is desirable as each of the U-phase switch 129U, the V-phase switch 129V and the W-phase switch 129W and a mechanical switch such as a relay or a contactor is usable. However, by using a switching element employing a WBG (Wide Band Gap) semiconductor such as SiC or GaN as each of these switches, the on-state resistance can be lowered and the heating of the element can also be reduced due to low loss. Especially when the connection states are switched in the middle of driving, it is desirable to form these switches with semiconductors.

Further, by configuring the semiconductors so that the connection state is the Y connection state when a normally-on element is in the on state, the loss on the low load (Y connection) side can be reduced and that is desirable for the air conditioner 100 in which the degree of contribution of the low load side is high.

Here, one of the U-phase power line 113U, the V-phase power line 113V and the W-phase power line 113W is referred to as a first line, another one of the power lines 113U, 113V and 113W is referred to as a second line, and the remaining line is referred to as a third line.

In such cases, a coil (112U, 112V, 112W) whose end (112Ua, 112Va, 112Wa) is connected to the first line serves as a first coil, a coil (112U, 112V, 112W) whose end (112Ua, 112Va, 112Wa) is connected to the second line serves as a second coil, and a coil (112U, 112V, 112W) whose end (112Ua, 112Va, 112Wa) is connected to the third line serves as a third coil.

Further, a switch (129U, 129V, 129W) that switches the connection targets of the other end (112Ub, 112Vb, 112Wb) of the first coil serves as a first switching unit, a switch (129U, 129V, 129W) that switches the connection targets of the other end (112Ub, 112Vb, 112Wb) of the second coil serves as a second switching unit, and a switch (129U, 129V, 129W) that switches the connection targets of the other end (112Ub, 112Vb, 112Wb) of the third coil serves as a third switching unit.

To return to FIG. 2, a shunt resistor 133 converts current flowing through buses L1 and L2 at the time of the switching of the inverter 126 into voltage proportional to the current and supplies the voltage to the current detection circuit 134.

The current detection circuit 134 is a current detection unit that detects a current value of the current on an input side of the inverter 126. While the current detection circuit 134 in this embodiment detects the current value of the bus current (input current) of the inverter 126, the detection of the current value is not limited to such an example. For example, the current value of the current on the input side of the inverter 126 may be calculated based on phase current of the inverter 126.

The outdoor control device 135 is an outdoor control unit that controls each part of the outdoor unit 110. Particularly, the outdoor control device 135 controls the outdoor air conditioning unit 114, the inverter 126 and the connection switching unit 128. Incidentally, the outdoor control device 135 is referred to also as a connection control unit since the outdoor control device 135 controls the connection switching unit 128 and thereby makes the connection switching unit 128 perform the switching of the connection states.

The outdoor control device 135 restricts the switching of the connection states when a switching count as the number of times of the switching of the connection states by the connection switching unit 128 exceeds a count threshold value.

For example, the outdoor control device 135 makes the connection switching unit 128 stop the switching of the connection states when the connection state switching count of the connection switching unit 128 exceeds the count threshold value.

Here, the outdoor control device 135 detects (counts) the switching count of the connection switching unit 128. Specifically, the outdoor control device 135 controls the connection switching unit 128 and counts the number of times of the switching when making each switching, like first time when making the switching from the Y connection to the Δ connection and second time when making the switching from the Δ connection to the Y connection. Then, the outdoor control device 135 restricts the switching by the connection switching unit 128 when the detected switching count exceeds the count threshold value. The method for the outdoor control device 135 to restrict the switching will be described later.

Incidentally, the switching count may also be calculated by counting only the execution of the switching from the Δ connection to the Y connection or the execution of the switching from the Y connection to the Δ connection and doubling the count. In such cases, if a predetermined connection state is set when the power is turned off, the switching count can be calculated with high accuracy by counting the execution of the switching from the predetermined connection state to the other connection state.

Further, when the switching count of the connection switching unit 128 exceeds the count threshold value, the outdoor control device 135 notifies the indoor unit 150 via the outdoor communication device 136 that the switching count has exceeded the count threshold value.

The outdoor control device 135 is capable of individually controlling the U-phase switch 129U, the V-phase switch 129V and the W-phase switch 129W. For example, the outdoor control device 135 is connected to the connection switching unit 128 by three control lines, which are a U-phase control line 135U for controlling the U-phase switch 129U, a V-phase control line 135V for controlling the V-phase switch 129V, and a W-phase control line 135W for controlling the W-phase switch 129W. The outdoor control device 135 is capable of controlling the switching of the U-phase switch 129U by transmitting the U-phase switching signal CSU for controlling the U-phase switch 129U to the U-phase switch 129U through the U-phase control line 135U. Similarly, the outdoor control device 135 is capable of controlling the switching of each of the V-phase switch 129V and the W-phase switch 129W by transmitting the V-phase switching signal CSV to the V-phase switch 129V through the V-phase control line 135V and transmitting the W-phase switching signal CSW to the W-phase switch 129W through the W-phase control line 135W.

The outdoor communication device 136 is an outdoor communication unit that performs communication with the indoor unit 150. For example, according to a command from the outdoor control device 135, the outdoor communication device 136 transmits to the indoor unit 150 a notification signal indicating that the switching count of the connection switching unit 128 has exceeded the count threshold value.

In cases where the outdoor unit 110 and the indoor unit 150 are connected together by three lines not including a communication line, the outdoor communication device 136 performs the communication by using a power line. In contrast, in cases where the outdoor unit 110 and the indoor unit 150 are connected together by four lines including a communication line, the outdoor communication device 136 performs the communication by using the communication line. Incidentally, it is also possible to connect the outdoor unit 110 and the indoor unit 150 together by using wireless connection, dedicated wired connection, or the like, and the outdoor communication device 136 may perform the communication by using such connection.

Figure 4:
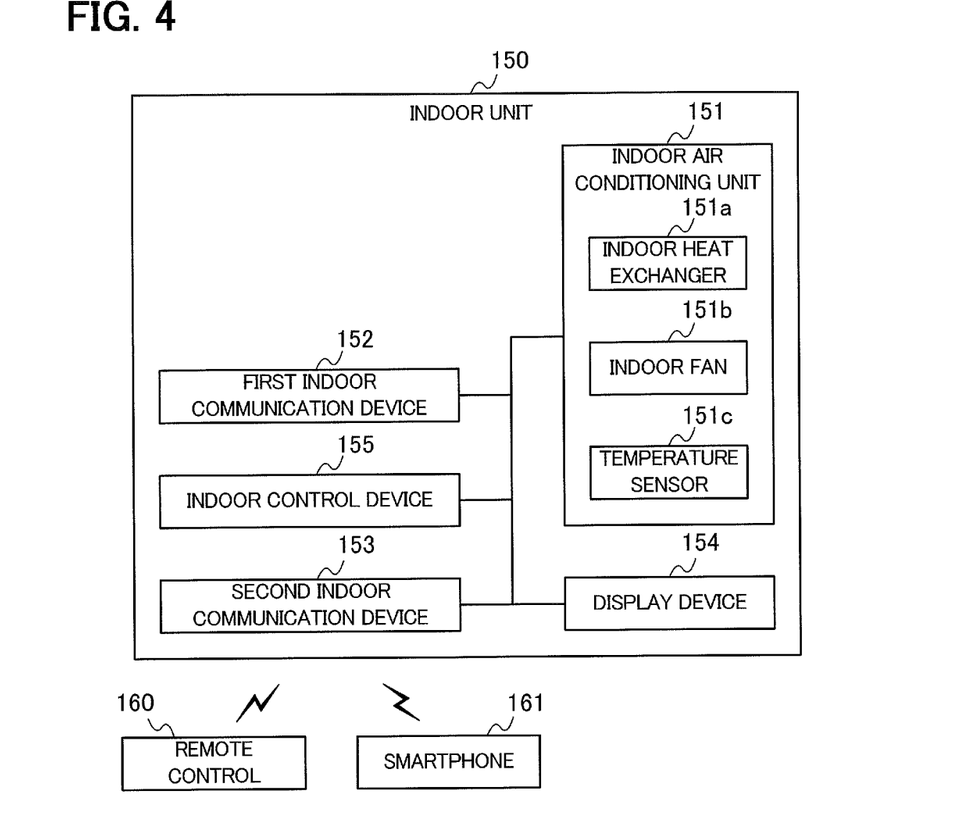
FIG. 4 is a block diagram schematically representing the configuration of an indoor unit in the embodiment.

FIG. 4 is a block diagram schematically representing the configuration of the indoor unit 150 in the embodiment.

The indoor unit 150 includes an indoor air conditioning unit 151, a first indoor communication device 152, a second indoor communication device 153, a display device 154 and an indoor control device 155.

The indoor air conditioning unit 151 performs an operation on an indoor side of the refrigeration cycle. For example, the indoor air conditioning unit 151 includes devices such as an indoor heat exchanger 151a, an indoor fan 151b and a temperature sensor 151c.

The indoor heat exchanger 151a performs heat exchange of the refrigerant.

The indoor fan 151b is a fan that sends air to the indoor heat exchanger 151a in the indoor unit 150.

The temperature sensor 151c detects the temperature. The temperature sensor 151c is provided at a certain point in the indoor unit 150, and the temperature detected by the temperature sensor 151c is handled as the temperature (room temperature) of the environment (room) around the position where the indoor unit 150 is installed.

The first indoor communication device 152 is a first indoor communication unit that performs communication with the outdoor unit 110.

The second indoor communication device 153 is a second indoor communication unit that performs communication with the remote control 160 or a smartphone 161 as a user terminal.

The display device 154 is a display unit that displays content according to a command from the indoor control device 155.

The indoor control device 155 is an indoor control unit that controls each part of the indoor unit 150.

Here, when the notification signal from the outdoor unit 110 is received by the first indoor communication device 152, the indoor control device 155 notifies the user that the switching count of the connection switching unit 128 has exceeded the count threshold value. For example, the indoor control device 155 makes the notification to the user by showing at least one of a display on the display device 154, a display on the remote control 160 and a display on the smartphone 161.

Specifically, the indoor control device 155 issues a command to the display device 154 and thereby makes the display device 154 show a display indicating that the switching count of the connection switching unit 128 has exceeded the count threshold value.

Further, the indoor control device 155 is capable of making the remote control 160 show a display indicating that the switching count of the connection switching unit 128 has exceeded the count threshold value by making the second indoor communication device 153 transmit a particular signal indicating that the switching count of the connection switching unit 128 has exceeded the count threshold value to the remote control 160. In such cases, the second indoor communication device 153 can be implemented by a communication interface using infrared rays, for example.

Furthermore, the indoor control device 155 is capable of making the smartphone 161 show a display indicating that the switching count of the connection switching unit 128 has exceeded the count threshold value by making the second indoor communication device 153 transmit notification data indicating that the switching count of the connection switching unit 128 has exceeded the count threshold value to the smartphone 161. In such cases, the second indoor communication device 153 can be implemented by a communication interface for wireless LAN (Local Area Network).

The remote control 160 functions as an input reception unit for receiving the input of various types of commands. For example, the remote control 160 receives an input for starting the operation of the air conditioner 100. Incidentally, the smartphone 161 may also function as the input reception unit.

Figure 5:
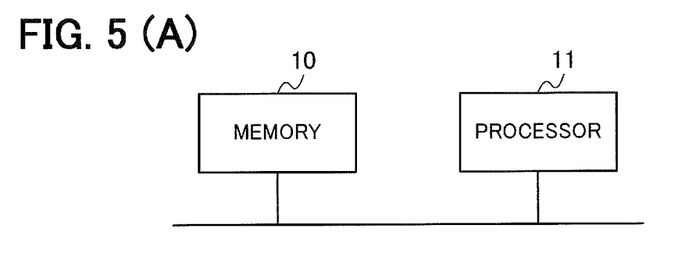
FIGS. 5(A) and 5(B) are schematic diagram representing hardware configuration examples of the embodiment.

Part or the whole of each of the outdoor control device 135 of the outdoor unit 110 and the indoor control device 155 of the indoor unit 150 described above can be implemented by a memory 10 and a processor 11 such as a CPU (Central Processing Unit) that executes a program stored in the memory 10 as shown in FIG. 5(A), for example. Such a program may be provided via a network or provided in the form of a record medium storing the program.

It is also possible to implement part or the whole of each of the outdoor control device 135 and the indoor control device 155 with a processing circuit 12 such as a single circuit, a combined circuit, a programmed processor, a parallelly programmed processor, an ASIC (Application Specific Integrated Circuit) or an FPGA (Field Programmable Gate Array) as shown in FIG. 5(B), for example.

Incidentally, the outdoor control device 135 and the indoor control device 155 described above are collectively referred to also as a control unit since the outdoor control device 135 and the indoor control device 155 control processes in the air conditioner 100.

Figure 6:
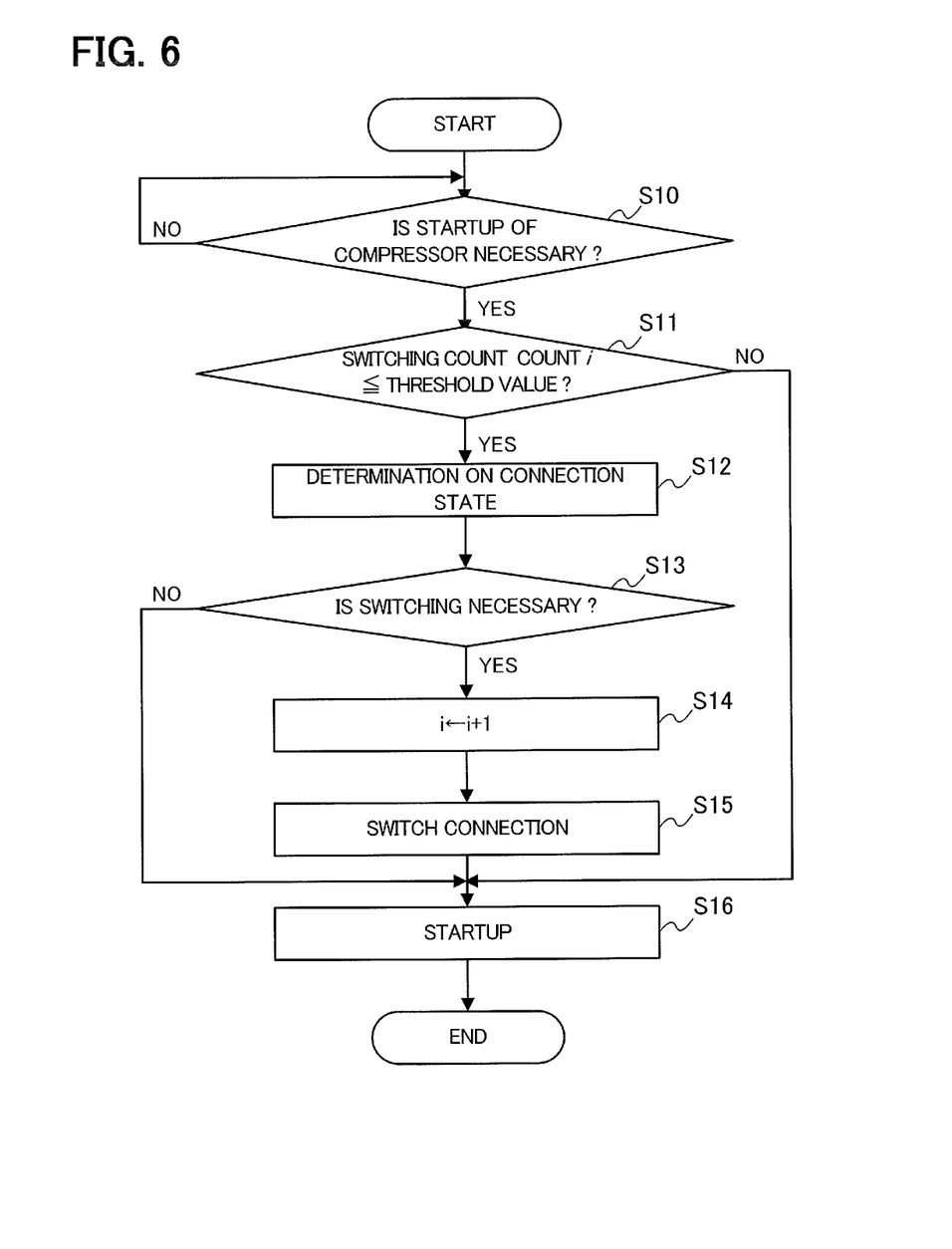
FIG. 6 is a flowchart indicating the operation of the air conditioner according to the embodiment.

FIG. 6 is a flowchart indicating the operation of the air conditioner 100 according to the embodiment.

First, the indoor control device 155 determines whether the startup of the compressor 114a is necessary or not (S10). When the startup of the compressor 114a is necessary, the process proceeds to step S11. Incidentally, when it is determined that the startup of the compressor 114a is necessary, the indoor control device 155 notifies the outdoor unit 110 via the first indoor communication device 152 that the startup of the compressor 114a is necessary.

For example, when an air conditioning operation start command is received, the indoor control device 155 determines that the startup of the compressor 114a is necessary. Specifically, the indoor control device 155 receives the air conditioning operation start command from the remote control 160, the smartphone 161 or the like via the second indoor communication device 153. The air conditioning operation start command mentioned here is followed by the startup of the compressor 114a, and thus the air conditioning operation start command can be referred to also as a compressor startup command.

Incidentally, in cases where the air conditioning operation start command is issued in a load condition in which the operation of the compressor 114a is unnecessary, such as cases where the user issues a heating operation command when the set temperature is lower than or equal to the room temperature, it is determined that the startup of the compressor 114a is unnecessary.

Further, when the absolute value of the difference between the set temperature specified by the air conditioning operation start command and the room temperature exceeds a predetermined threshold value, the indoor control device 155 determines that the startup of the compressor 114a is necessary.

Subsequently, when a notification indicating the reception of the air conditioning operation start command is received via the outdoor communication device 136, the outdoor control device 135 determines whether or not the switching count i of the connection switching unit 128 is less than or equal to the count threshold value (S11). When the switching count i is less than or equal to the count threshold value (Yes in S11), the process proceeds to step S12. In this case, the outdoor control device 135 notifies the indoor unit 150 via the outdoor communication device 136 that the switching count i is less than or equal to the count threshold value. In contrast, when the switching count i exceeds the count threshold value (No in S11), the process proceeds to step S16 without executing the steps S12 to S15, namely, proceeds to a startup sequence of the compressor 114a without executing the switching of the connection states.

In the step S12, when the notification indicating that the switching count i is less than or equal to the count threshold value is received via the first indoor communication device 152, the indoor control device 155 determines whether the connection state of the motor 111 should be set to the Y connection or the Δ connection so as to set the motor 111 to a connection state in which efficient operation is possible. Then, the indoor control device 155 notifies the outdoor unit 110 via the first indoor communication device 152 of the result of the determination on the connection state (Y connection or Δ connection).

Here, the indoor control device 155 determines that the connection state should be the Δ connection when the absolute value of the difference between the set temperature specified by the air conditioning operation start command received from the remote control 160, the smartphone 161 or the like and the room temperature detected by the temperature sensor 151c exceeds a predetermined temperature threshold value, or determines that the connection state should be the Y connection when the absolute value is less than or equal to the predetermined temperature threshold value. The temperature threshold value is the absolute value of the difference between the room temperature and the set temperature when electric power inputted to the compressor 114a (input electric power) is in a predetermined load condition between the intermediate condition and the rated condition. Here, the predetermined load condition LC is calculated by using the following expression (1), for example:

$$LC = (\text{input electric power in intermediate condition} + \text{input electric power in rated condition}) \div 2 \quad (1)$$

Incidentally, the method of the determination on the connection state described here is just an example and it is permissible if it is previously determined whether the connection state should be set to the Δ connection or the Y connection depending on at least one of relationship between the contents of the operation command (user command) from the user (temperature, humidity, air flow rate, cooling, heating, wind direction, etc.) and indoor and outdoor temperatures, presence/absence of a user or a heat source based on each piece of sensor information (information from a thermosensor, a motion sensor, a camera or the like), and operating condition of the air conditioner 100 (input electric power to the indoor unit 150, input electric power to the outdoor unit 110, input electric power to the compressor 114a, revolution speed of the compressor 114a, or the like), for example. The timing of the determination on the connection switching is not limited to the time of startup; the connection switching determination may also be made in the middle of operation. In this case, the connection switching can be executed with better timing.

When a notification of the result of the determination on the connection state is received via the outdoor communication device 136, the outdoor control device 135 determines whether it is necessary to switch the connection states or not, based on the current connection state of the motor 111 (S13). When it is necessary to switch the connection states (Yes in S13), the process proceeds to step S14. When it is unnecessary to switch the connection states (No in S13), the process proceeds to step S16.

In the step S14, the outdoor control device 135 adds "1" to the switching count i.

Then, the outdoor control device 135 issues a command to the connection switching unit 128 and thereby makes the connection switching unit 128 switch the connection states (S15). Then, the process proceeds to the step S16.

In the step S16, the outdoor control device 135 proceeds to the startup sequence of the compressor 114*a*.

By performing control like the flow shown in FIG. 6, the occurrence of failure of the connection switching unit 128 can be controlled since the switching of the connection states can be canceled when the switching count of the connection switching unit 128 has exceeded the count threshold value.

Incidentally, the count threshold value may be so set that a margin is secured from an operation-guaranteed count of parts used for the connection switching unit 128. Further, the count threshold value may be changed depending on the ambient temperature (e.g., mean value) of the installation environment of the air conditioner 100. Furthermore, a system with higher reliability can be constructed by changing the count threshold value by using a temporal coefficient representing the influence of aging deterioration on the count threshold value. For example, the count threshold value may be decreased with the increase in the age of use of the air conditioner 100.

Incidentally, while the determination by comparing the switching count of the connection switching unit with the count threshold value is made by the outdoor control device 135 in FIG. 6, the notification indicating that the switching count i is less than or equal to the count threshold value is sent from the outdoor control device 135 to the indoor control device 155 via the outdoor communication device 136 in cases where the switching count of the connection switching unit 128 is less than or equal to the count threshold value, and thus the determination in the step S11 may also be made by the indoor control device 155 by use of the notification.

Moreover, the outdoor control device 135 and the indoor control device 155 may also be configured so that one of them executes the processing of the steps S10 to S14 by notifying each other of necessary information.

For example, by executing the notification, from the indoor control device 155 to the outdoor control device 135, of the contents of the air conditioning operation start command and the room temperature detected by the temperature sensor 151*c*, the outdoor control device 135 execute the processing of the steps S10 to S16.

Further, while the switching count of the connection switching unit 128 is counted by the outdoor control device 135 in FIG. 6, the switching count may also be counted by the indoor control device 155 based on the result of the determination on the connection state. In such cases, the process can be simplified since the processing from the step S10 to the step S14 in FIG. 6 can be carried out by the indoor control device 155.

While the switching operation of the connection switching unit 128 is stopped in FIG. 6 when the switching count of the connection switching unit 128 exceeds the count threshold value, it is possible to reduce the loss on the low load side and maintain the high efficiency state by fixing the connection state in the Y connection in such cases. In cases where the air conditioner 100 is used in combination with HEMS (Home Energy Management System) or ZEH (Net Zero Energy House), fixing the connection state in the Y connection is desirable since the efficiency in the low output power region becomes important.

Further, while the switching operation of the connection switching unit 128 is stopped in FIG. 6 when the switching count of the connection switching unit 128 exceeds the count threshold value, it is possible to reduce the loss on the high load side and maintain the high output power state by fixing the connection state in the A connection in such cases. For example, fixing the connection state in the Δ connection is desirable in environments where operation in the high output power state is required, such as in a region where the environment such as outside air is harsh, in a space of poor heat insulation, or the like.

Incidentally, it is also possible to configure the outdoor control device 135 or the indoor control device 155 to automatically select the connection state fixed at the time of stopping the connection switching based on information on the use environment of the air conditioner 100. For example, the outdoor control device 135 or the indoor control device 155 may keep operation logs of the air conditioner 100 and fix the connection state in the Y connection when the time of operation under a load lower than or equal to a predetermined load is long or fix the connection state in the Δ connection when the time of operation under a load higher than the predetermined load is long.

It is also possible to let the user select the fixed connection state through the remote control 160, the smartphone 161, or the like.

While the outdoor control device 135 stops the switching of the connection states by the connection switching unit 128 when the switching count exceeds the count threshold value in the flow shown in FIG. 6, this embodiment is not limited to such an example. For example, when the switching count exceeds the count threshold value, the outdoor control device 135 may set the frequency of the switching of the connection states by the connection switching unit 128 at a frequency lower than that in cases where the switching count is less than or equal to the count threshold value.

Figure 7:
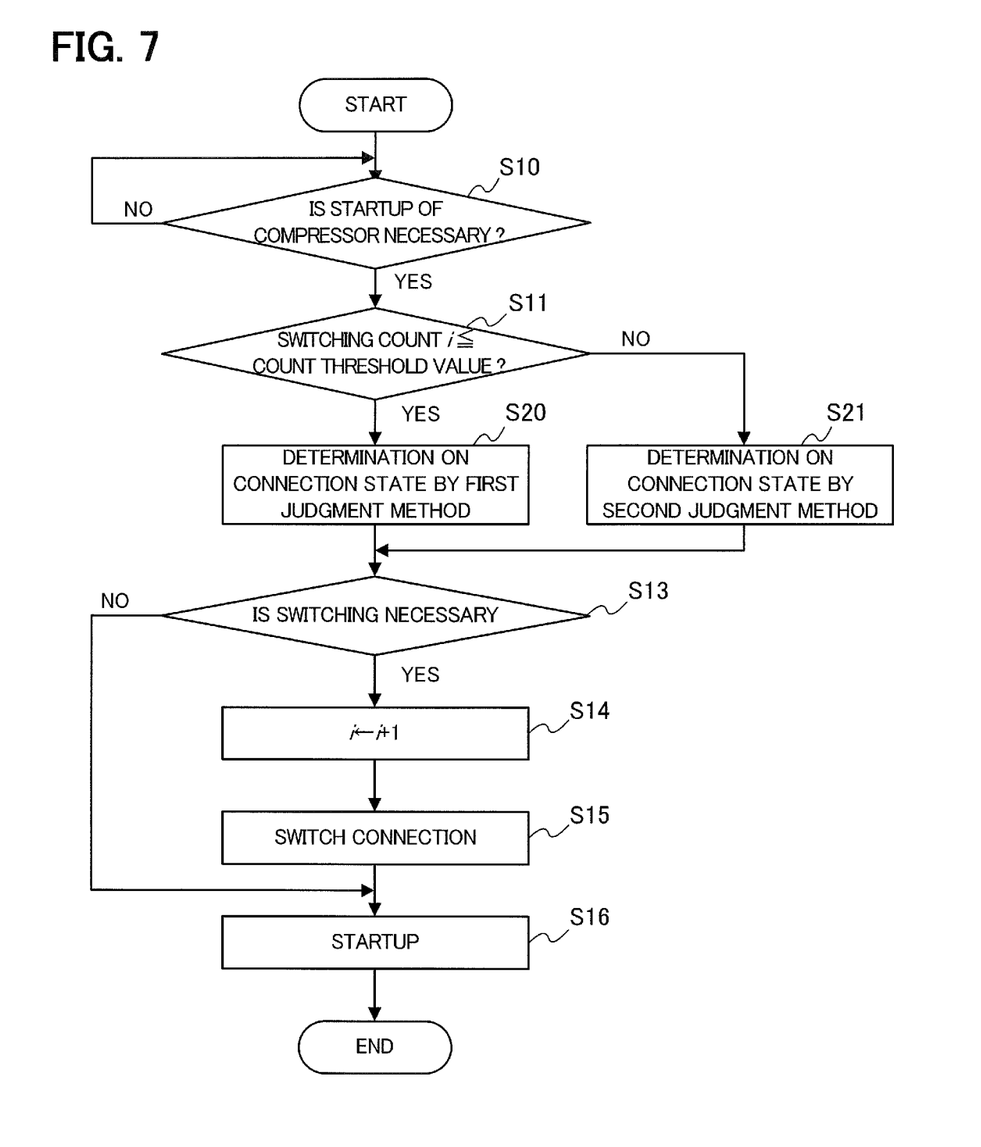
FIG. 7 is a flowchart indicating a first modification of the operation of the air conditioner according to the embodiment.

For example, the air conditioner 100 may execute a flow shown in FIG. 7 instead of the flow shown in FIG. 6.

FIG. 7 is a flowchart indicating a first modification of the operation of the air conditioner 100 according to the embodiment.

Among the steps shown in FIG. 7, steps similar to those shown in FIG. 6 are assigned the same reference characters as in FIG. 6.

The processing in the steps S10 and S11 in FIG. 7 is similar to that in the steps S10 and S11 in FIG. 6. However, when the switching count i is less than or equal to the count threshold value in the step S11 (Yes in S11) in FIG. 7, the process proceeds to step S20. In contrast, when the switching count i exceeds the count threshold value (No in S11), the process proceeds to step S21. In this case, the outdoor control device 135 notifies the indoor unit 150 via the outdoor communication device 136 that the switching count i has exceeded the count threshold value.

In the step S20, when the notification indicating that the switching count i is less than or equal to the count threshold value is received via the first indoor communication device 152, the indoor control device 155 determines by a first determination method whether the connection state of the motor 111 should be set to the Y connection or the Δ connection so as to set the motor 111 to a connection state in which efficient operation is possible. Then, the process proceeds to the step S13.

In contrast, in the step S21, when the notification indicating that the switching count i has exceeded the count threshold value is received via the first indoor communication device 152, the indoor control device 155 determines by a second determination method whether the connection state of the motor 111 should be set to the Y connection or the Δ connection. Then, the process proceeds to the step S13.

The second determination method, employing a state with which the switching is less likely to occur than in the first determination method, is a determination method that reduces the switching count compared to cases where the determination on the switching is made by the first determination method.

For example, in cases where the indoor control device 155 is capable of recognizing the current connection state such as cases where the outdoor control device 135 notifies the indoor control device 155 of the current connection state or the connection state returns to the Y connection upon the cessation of the operation of the air conditioner 100, the following determination method can be employed:

In cases where the current connection state is the Y connection, it is determined according to the first determination method that the connection state should be switched to the Δ connection when the absolute value of the difference between the set temperature and the room temperature exceeds a first temperature threshold value, and it is determined according to the second determination method that the connection state should be switched to the Δ connection when the absolute value of the difference between the set temperature and the room temperature exceeds a second temperature threshold value greater than the first temperature threshold value.

Here, the first temperature threshold value is the absolute value of the difference between the room temperature and the set temperature when the input electric power of the compressor 114a is in a predetermined load condition between the intermediate condition and the rated condition, for example. The predetermined load condition LC is calculated by using the aforementioned expression (1), for example.

In contrast, the second temperature threshold value is the absolute value of the difference between the room temperature and the set temperature when the input electric power of the compressor 114a is in the rated condition.

In such cases, even though there is the apprehension of a decrease in the system efficiency in load conditions close to the rated condition, a sufficient range of high output power operation can be maintained since the motor is driven in the Δ connection in cases of high load operation like the overload condition.

In contrast, in cases where the current connection state is the Δ connection, it is determined according to the first determination method that the connection state should be switched to the Y connection when the absolute value of the difference between the set temperature and the room temperature exceeds the first temperature threshold value, and it is determined according to the second determination method that the connection state should be switched to the Y connection when the absolute value of the difference between the set temperature and the room temperature exceeds a third temperature threshold value smaller than the first temperature threshold value.

For example, the third temperature threshold value is the absolute value of the difference between the room temperature and the set temperature when the input electric power of the compressor 114a is in the intermediate condition.

In such cases, even though there is the apprehension of a decrease in the system efficiency in load conditions close to the intermediate condition, high efficiency can be maintained in an operation range in the intermediate condition as a load condition of the air conditioner 100 having the greatest influence on the annual performance factor (APF).

In other words, the first determination method and the second determination method are determination methods to determine whether the connection states should be switched or not by deciding the load on the air conditioner 100 based on the absolute value of the difference between the set temperature and the room temperature and comparing the load on the air conditioner 100 with a predetermined load between the intermediate condition and the rated condition.

Incidentally, the temperature threshold value used in the second determination method may be either the second temperature threshold value or the third temperature threshold value.

For example, in cases where the connection state returns to the Y connection when the operation of the air conditioner 100 is stopped, using the second temperature threshold value in the second determination method makes the switching less likely to occur. In contrast, in cases where the connection state returns to the Δ connection when the operation of the air conditioner 100 is stopped, using the third temperature threshold value in the second determination method makes the switching less likely to occur.

The processing in the steps S13 to S16 in FIG. 7 is the same as the processing in the steps S13 to S16 in FIG. 6.

By making the switching less likely to occur as above, the frequency of the switching operation (the switching count) can be reduced, by which the occurrence of failure due to the switching operation of the connection switching unit 128 exceeding the operation-guaranteed count can be controlled.

Incidentally, as for the condition for the switching from the Y connection to the Δ connection and the condition for the switching from the Δ connection to the Y connection, there is no problem even if these conditions are not the same as each other and a hysteresis region is provided. In such cases, the switching at times of operation in the vicinity of the switching determination conditions can be controlled. Especially in air conditioners 100 that stop the compressor 114a when switching the connection states, the air conditioning load increases when the compressor 114a is stopped, and thus setting the switching determination condition from the Y connection to the Δ connection at a point higher than the crossing point of the system efficiency in the Y connection and the system efficiency in the Δ connection makes it possible to drive the motor with high efficiency in a wide range while unnecessary switching of the connection states is controlled.

Figure 8:
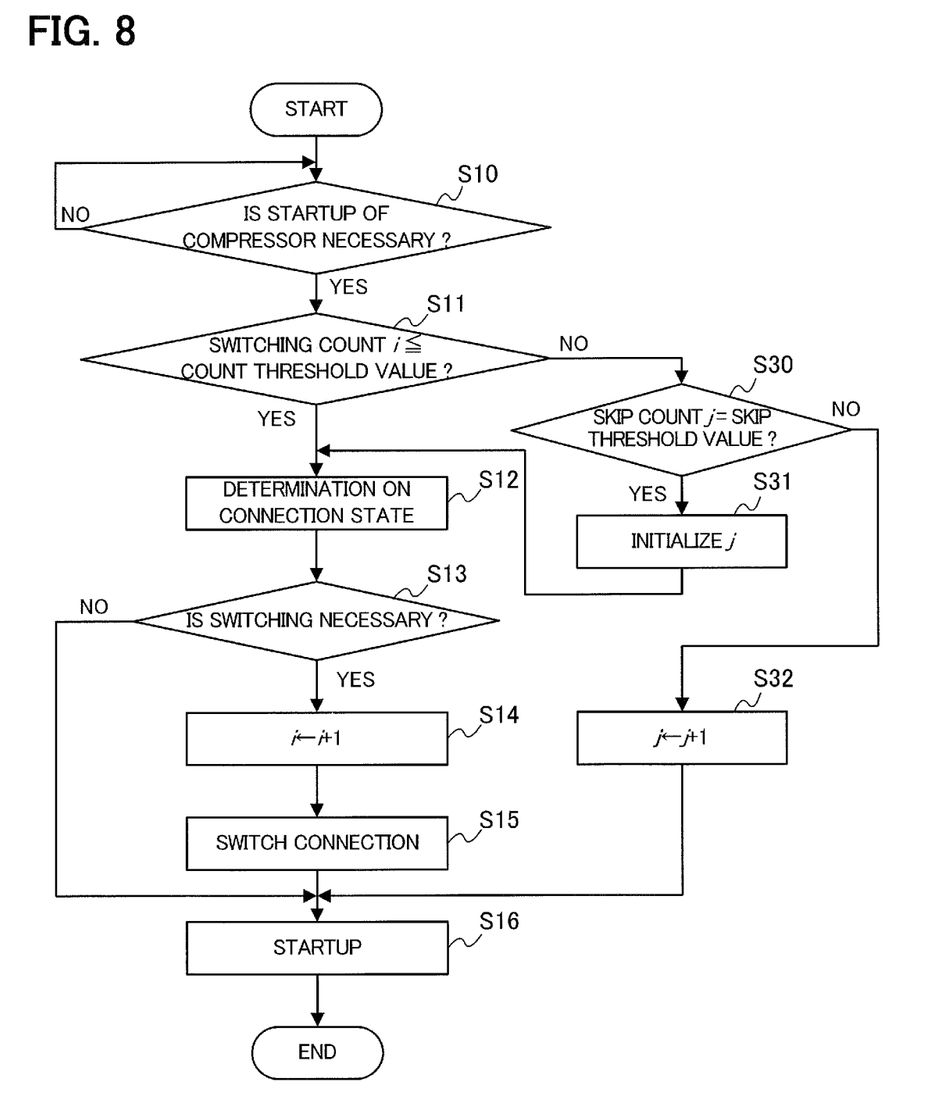
FIG. 8 is a flowchart indicating a second modification of the operation of the air conditioner according to the embodiment.

Incidentally, while the occurrence frequency of the switching of the connection states is reduced in FIG. 7 by making the switching by the connection switching unit 128 less likely to occur, the occurrence frequency of the switching of the connection states can be reduced also by reducing the frequency of the determination on the switching of the connection states as shown in FIG. 8. While this embodiment is described by using the absolute value of the difference between the set temperature and the room temperature, this embodiment is of course not limited to this example. As mentioned earlier, it is permissible if there have previously been determined a plurality of determination values regarding whether the connection state should be set to the Δ connection or the Y connection depending on at least one of the relationship between the contents of the operation command (user command) from the user (temperature, humidity, air flow rate, cooling, heating, wind direction, or the like) and indoor and outdoor temperatures, the presence/absence of a user or a heat source based on each piece of sensor information (information from a thermosensor, a motion sensor, a camera, or the like), and the operating condition of the air conditioner 100 (input electric power to the indoor unit 150, input electric power to the outdoor unit 110, input electric power to the compressor 114a, revolution speed of the compressor 114a, or the like), for example.

FIG. 8 is a flowchart indicating a second modification of the operation of the air conditioner 100 according to the embodiment.

Among the steps shown in FIG. 8, steps similar to those shown in FIG. 6 are assigned the same reference characters as in FIG. 6.

The processing in the steps S10 to S16 in FIG. 8 is similar to that in the steps S10 to S16 in FIG. 6. However, when the switching count i exceeds the count threshold value in the step S11 in FIG. 8 (No in S11), the process proceeds to step S30. In this case, the outdoor control device 135 notifies the indoor unit 150 via the outdoor communication device 136 that the switching count i has exceeded the count threshold value.

In the step S30, when the notification indicating that the switching count i has exceeded the count threshold value is received via the first indoor communication device 152, the indoor control device 155 determines whether or not a skip count j has reached a predetermined skip threshold value. When the skip count j has reached the predetermined skip threshold value (Yes in S30), the process proceeds to step S31. When the skip count j has not reached the predetermined skip threshold value (No in S30), the process proceeds to step S32.

In the step S31, the indoor control device 155 initializes the skip count j. In this step, the indoor control device 155 returns the skip count j to "0", for example. Then, the process proceeds to the step S12.

In the step S32, the indoor control device 155 adds "1" to the skip count j. Then, the process proceeds to the step S16.

Figure 9:
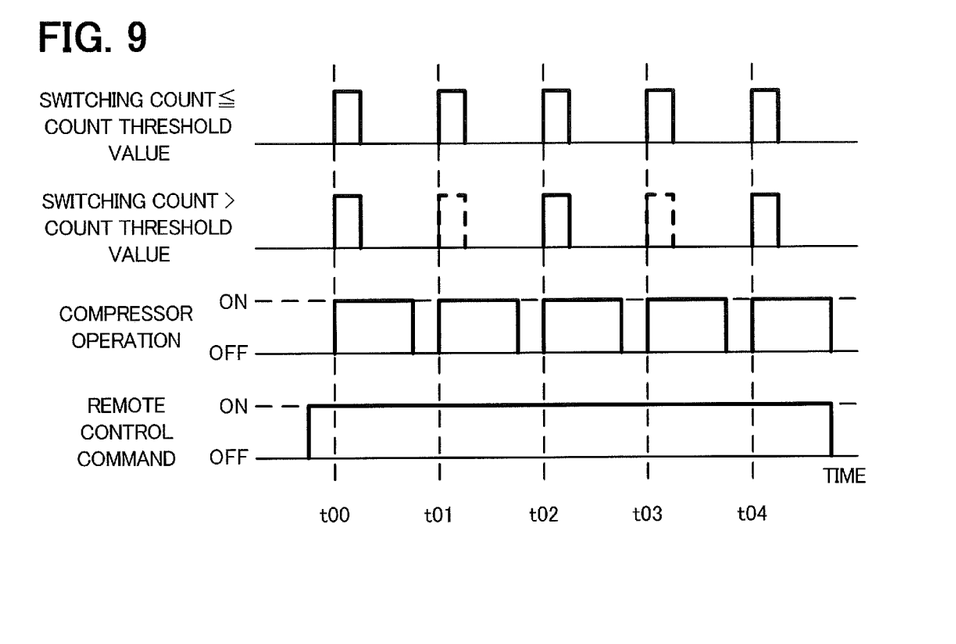
FIG. 9 is a schematic diagram for explaining a first example of the number of times of determination on the connection state when a switching count is less than or equal to a count threshold value and when the switching count exceeds the count threshold value.

According to the flow shown in FIG. 8, in cases where the switching count is less than or equal to the count threshold value when the compressor 114a is stopped as shown in FIG. 9, for example, the determination on the connection state (Y, A) is made upon each startup of the compressor 114a. However, when the switching count has exceeded the count threshold value, the determination on the connection state is made every other startup of the compressor 114a if the skip threshold value has been set at "1". In the example of FIG. 9, the determination on the connection state is made at time t00, time t02 and time t04, and the determination on the connection state is not made at time t01 and time t03.

Incidentally, the skip threshold value may be any integer larger than or equal to "1".

As above, according to the flow shown in FIG. 8, the frequency of the connection switching can be reduced by controlling the occurrence frequency itself of the connection state determination.

Incidentally, while conditions for the cessation of the compressor 114a include the switching of the operation mode (heating, cooling, dehumidification, circulation, etc.), the turning off of the temperature control (when the room temperature reaches the set temperature), and so forth, there is no problem irrespective of whether both of the conditions are considered or only one of the conditions is considered.

Incidentally, the determination on the connection state may be made not only when the air conditioning operation start command is received in the state in which the compressor 114a is stopped but also each time predetermined period passes while the operation of the compressor 114a is continued. In this case, it becomes possible to make the switching of the connection states with more appropriate timing or condition.

Figure 10:
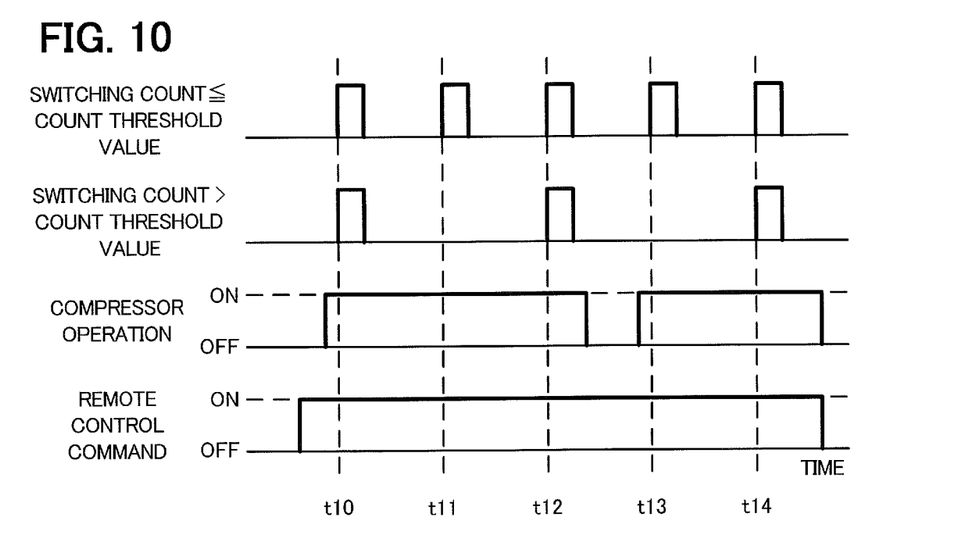
FIG. 10 is a schematic diagram for explaining a second example of the number of times of the determination on the connection state when the switching count is less than or equal to the count threshold value and when the switching count exceeds the count threshold value.

In such cases, by reducing the frequency of making the determination on the connection state when the switching count has exceeded the count threshold value in comparison with the frequency of making the determination on the connection state when the switching count is less than or equal to the count threshold value as shown in FIG. 10, it is possible to control the excess over the switching-guaranteed count due to the increase in the switching count, extend the operating life of the system, and increase the reliability of the system. In the example of FIG. 10, while the determination on the connection state is made at time t10, time t12, time t13 and time t14 when the switching count is less than or equal to the count threshold value, the determination on the connection state is made at time t10, time t12 and time t13 when the switching count has exceeded the count threshold value.

In such cases, the determination on whether the connection states should be switched or not is made every first period when the switching count is less than or equal to the count threshold value, and the determination on whether the connection states should be switched or not is made every second period longer than the first period when the switching count has exceeded the count threshold value, for example, by which the frequency of making the determination on the switching of the connection states can be made lower than that in cases where the switching count is less than or equal to the count threshold value.

Incidentally, while the flows in FIG. 7 and FIG. 8 are configured so that the connection switching becomes less likely to occur when the switching count has exceeded the count threshold value, this embodiment is not limited to such an example.

For example, it is also possible to set a plurality of count threshold values and change the connection switching determination methods multiple times. Specifically, it is possible to change the connection switching determination methods from the first determination method to the second determination method when the switching count exceeds a first count threshold value and change the connection switching determination methods from the second determination method to a third determination method when the switching count exceeds a second count threshold value larger than the first count threshold value. Here, the second determination method is a determination method with which the connection switching is less likely to occur compared to the first determination method, and the third determination method is a determination method with which the connection switching is less likely to occur compared to the second determination method.

Further, it is also possible to set a plurality of count threshold values and change the methods of limiting the connection switching depending on the count threshold values.

For example, it is possible to change the connection switching determination methods from the first determination method to the second determination method when the switching count exceeds a first count threshold value and stop the connection switching when the switching count exceeds a second count threshold value larger than the first count threshold value. Here, the second determination method is a determination method with which the connection switching is less likely to occur than with the first determination method.

Here, the outdoor control device 135 is capable of notifying the user of information while carrying out processing based on the switching count of the connection switching unit 128.

For example, when the operation of the connection switching unit 128 is stopped, the outdoor control device 135 may show a display with an LED (not shown) or on the remote control 160 to indicate that the operation of the connection switching unit 128 has been stopped.

Further, when the switching determination methods are changed, the outdoor control device 135 may show a display with an LED (not shown) or on the remote control 160 to indicate that the switching has become less likely to occur or the switching count has exceeded the guaranteed count.

This enables the user to appropriately update the equipment, if necessary, as well as to grasp its operating condition. When the product is within the warranty period, the user can wait for repair by support while making the operation be continued the operation since the use of the product for an appropriate period can become possible by component replacement of the connection switching unit 128. It is also possible to let the user disable the notification (display with an LED or display on the remote control).

Incidentally, since the U-phase switch 129U, the V-phase switch 129V and the W-phase switch 129W are capable of operating individually, the system can be formed with a power supply circuit of a lower capacity and the point of occurrence of failure can be detected more correctly compared to cases where all the switches are operated concurrently.

By using semiconductor switches, specifically, switching elements employing a WBG semiconductor, as the U-phase switch 129U, the V-phase switch 129V and the W-phase switch 129W, the on-state resistance can be lowered and the heating of the elements can also be reduced due to low loss.

What is claimed is:

1. An air conditioner using a refrigeration cycle, comprising:
    a compressor to compress a refrigerant used in the refrigeration cycle;
    a converter to generate direct current voltage;
    an inverter to generate three-phase alternating current voltage from the direct current voltage;
    a motor to generate driving force to drive the compressor by using a plurality of coils, the three-phase alternating current voltage is applied to the plurality of coils;
    plurality of switches to switch connection states of the plurality of coils; and
    processing circuitry to control the plurality of switches,
    wherein the processing circuitry restricts the switching of the connection states when a switching count of the connection states exceeds a count threshold value.

2. The air conditioner according to claim 1, wherein the processing circuitry stops the switching of the connection states when the switching count exceeds the count threshold value.

3. The air conditioner according to claim 1, wherein when the switching count exceeds the count threshold value, the processing circuitry reduces a frequency of the switching of the connection states compared to cases where the switching count is less than or equal to the count threshold value.

4. The air conditioner according to claim 3, wherein when the switching count exceeds the count threshold value, determination methods for determination on the switching of the connection states are changed from a first determination method used when the switching count is less than or equal to the count threshold value to a second determination method with which the switching of the connection states is less likely to occur than with the first determination method.

5. The air conditioner according to claim 4, wherein, according to the first determination method and the second determination method, it is determined whether the connection states should be switched or not by comparing a load on the air conditioner with a predetermined load between an intermediate condition and a rated condition.

6. The air conditioner according to claim 3, wherein when the switching count exceeds the count threshold value, a frequency of making determination on the switching of the connection states is reduced compared to cases where the switching count is less than or equal to the count threshold value.

7. The air conditioner according to claim 6, wherein
    when the switching count is less than or equal to the count threshold value, the determination on the switching of the connection states is made every startup of the compressor, and
    when the switching count exceeds the count threshold value, the determination on the switching of the connection states is made every multiple startups of the compressor.

8. The air conditioner according to claim 6, wherein
    when the switching count is less than or equal to the count threshold value, the determination on the switching of the connection states is made every first period, and
    when the switching count exceeds the count threshold value, the determination on the switching of the connection states is made every second period longer than the first period.

9. The air conditioner according to claim 1,
    wherein
    the inverter and the motor are connected together by a first line, a second line and a third line,
    the plurality of coils are a first coil, a second coil, and a third coil, one end of the first coil being connected to the first line, one end of the second coil being connected to the second line, one end of the third coil being connected to the third line,
    the plurality of switches includes
    a first switch to switch a connection target of another end of the first coil;
    a second switch to switch a connection target of another end of the second coil; and
    a third switch to switch a connection target of another end of the third coil, and
    the first switch, the second switch, and the third switch are semiconductor switches.

10. The air conditioner according to claim 9, wherein the semiconductor switches are switching elements employing a WBG semiconductor.

* * * * *